(12) United States Patent
Kawamura et al.

(10) Patent No.: US 12,547,010 B2
(45) Date of Patent: Feb. 10, 2026

(54) DIFFRACTION ELEMENT DEVICE

(71) Applicant: NTT, Inc., Tokyo (JP)

(72) Inventors: Sohan Kawamura, Tokyo (JP); Yurina Tanaka, Tokyo (JP); Takashi Sakamoto, Tokyo (JP); Masahiro Ueno, Tokyo (JP); Yuichi Akage, Tokyo (JP); Soichi Oka, Tokyo (JP)

(73) Assignee: NTT, Inc., Tokyo (JP)

( * ) Notice: Subject to any disclaimer, the term of this patent is extended or adjusted under 35 U.S.C. 154(b) by 440 days.

(21) Appl. No.: 18/040,562

(22) PCT Filed: Aug. 19, 2020

(86) PCT No.: PCT/JP2020/031224
§ 371 (c)(1),
(2) Date: Feb. 3, 2023

(87) PCT Pub. No.: WO2022/038698
PCT Pub. Date: Feb. 24, 2022

(65) Prior Publication Data
US 2023/0273446 A1    Aug. 31, 2023

(51) Int. Cl.
*G02B 5/18*   (2006.01)
*G02B 26/08*  (2006.01)
*G02B 27/09*  (2006.01)
*G02B 27/42*  (2006.01)
*G02F 1/29*   (2006.01)

(52) U.S. Cl.
CPC ....... *G02B 27/0944* (2013.01); *G02B 5/1828* (2013.01); *G02B 26/0808* (2013.01); *G02B 27/42* (2013.01); *G02F 1/294* (2021.01); *G02B 2207/117* (2013.01); *G02F 1/292* (2013.01)

(58) Field of Classification Search
None
See application file for complete search history.

(56) References Cited

U.S. PATENT DOCUMENTS 3,942,048 A * 3/1976 Laude .................. G02F 1/292
                                                  250/237 G
6,847,749 B1 * 1/2005 Spremo ............... G02B 5/1828
                                                      385/37
(Continued)

FOREIGN PATENT DOCUMENTS

WO    WO-9948197 A2 *  9/1999 .......... G02B 5/1828

OTHER PUBLICATIONS

Japan Society of Applied Physics, "Introduction to Diffractive Optical Elements", Supplementary Revised Edition, published by Optronics, Co., Ltd., Feb. 8, 2006, p. 10. As discussed in the specification.

*Primary Examiner* — Derek S. Chapel
(74) *Attorney, Agent, or Firm* — Slater Matsil, LLP

(57) ABSTRACT

A diffraction element device includes a diffractive element and a power source, the diffractive element includes a substrate and a plurality of multi-step structures, each of the multi-step structures is composed of a plurality of steps, an electrode is provided at a part of the multi-step structures, a piezoelectric material or an electrostrictive material is included in a part of the multi-step structures, the power source is connected to the electrode or the substrate, and a height of the multi-step structures changes due to a voltage applied from the power source.

12 Claims, 9 Drawing Sheets

(56) References Cited

U.S. PATENT DOCUMENTS

| | | | |
|---|---|---|---|
| 2002/0105725 A1* | 8/2002 | Sweatt | G02B 27/46 |
| | | | 359/566 |
| 2004/0201891 A1* | 10/2004 | Schrader | G02B 26/0825 |
| | | | 359/558 |
| 2006/0039053 A1* | 2/2006 | Yang | G02B 26/105 |
| | | | 359/204.2 |
| 2008/0055710 A1* | 3/2008 | Yun | G02B 26/02 |
| | | | 359/290 |
| 2012/0243095 A1* | 9/2012 | Sagberg | G02B 5/1828 |
| | | | 438/700 |

* cited by examiner

DIFFRACTION ELEMENT DEVICE

CROSS-REFERENCE TO RELATED APPLICATIONS

This application is a national phase entry of PCT Application No. PCT/JP2020/031224, filed on Aug. 19, 2020, which application is hereby incorporated herein by reference.

TECHNICAL FIELD

The present invention relates to a diffraction element device.

BACKGROUND

Optical systems for beam-forming in a desired light intensity distribution using the diffraction phenomenon of light are used in many fields such as industry and medicine. Among them, a diffractive element has a high degree of freedom in beam-forming, and enables an optical system to be constructed with a small number of optical elements.

A generally known element is a surface relief-type diffractive element having a multi-step structure (convex-concave structure) on a substrate, examples of which include Fresnel lenses and multifocal lenses as described in NPL 1.

CITATION LIST

Non Patent Literature

[NPL 1] "Introduction to Diffractive Optical Elements, Supplementary Revised Edition," supervised by Japan Society of Applied Physics and published by Optronics, Co., Ltd., Feb. 8, 2006, p. 10.

SUMMARY

Technical Problem

However, because the height of the multi-step structure of the conventional surface relief-type diffractive element is uniformly determined according to a wavelength, diffractive elements with different heights of the multi-step structure depending on the wavelengths to be used are manufactured even if they have the same desired light intensity distribution, and thus there is the problem of increasing costs and lead time.

Further, even when the height of the multi-step structure is made variable, there is a problem that a distance from the diffractive element to a position where a desired light intensity distribution is imaged, that is, the focal length, changes.

Solution to Problem

To solve the above-described problem, a diffraction element device of embodiments of the present invention includes a diffractive element and a power source, the diffractive element includes a substrate and a plurality of multi-step structures, each of the multi-step structures is composed of a plurality of steps, an electrode is provided at a part of the multi-step structures, a piezoelectric material or an electrostrictive material is included in a part of the multi-step structures, the power source is connected to the electrode or the substrate, and a height of the multi-step structures changes due to a voltage applied from the power source.

In addition, the diffraction element device according to embodiments of the present invention includes an upper substrate, a lower substrate, a plurality of multi-step structures on the upper substrate, an actuator disposed between the upper substrate and the lower substrate, and a power source connected to the actuator, the upper substrate, or the lower substrate, and a curvature of the upper substrate changes due to a voltage applied to the actuator from the power source.

Advantageous Effects of Embodiments of Invention

According to the present invention, a diffraction element device capable of changing a wavelength and a focal length can be provided.

DETAILED DESCRIPTION OF ILLUSTRATIVE EMBODIMENTS

First Embodiment

A diffraction element device according to a first embodiment of the present invention will be described with reference to FIGS. 1 to 3.

Configuration of Diffraction Element Device

Figure 1:
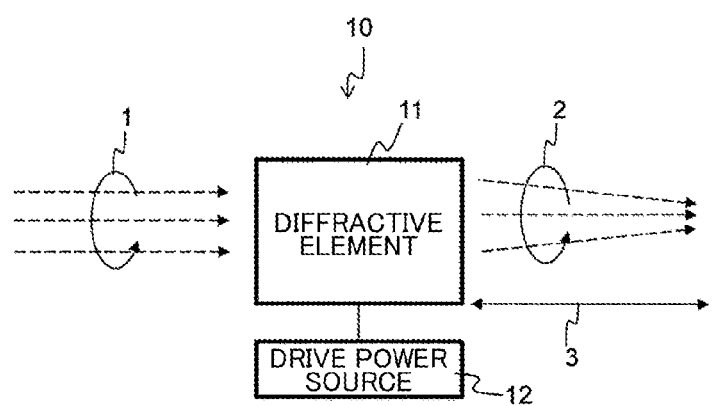
FIG. 1 is a schematic diagram of a diffraction element device according to a first embodiment of the present invention.

FIG. 1 shows a schematic diagram of a configuration of a diffraction element device 10 according to the first embodiment. The diffraction element device 10 includes a diffractive element 11 and a drive power source 12 connected to the diffractive element 11.

The diffractive element 11 is of a relief type, and has a multi-step structure 112 (which will be described later). A light beam (incident light) 1 incident on the diffractive element 11 has a phase changed by the multi-step structure 112 (which will be described below), and is emitted as a light beam (diffracted light) 2. The light beam 2 forms a desired light intensity distribution at a focal length 3 and is condensed. The diffractive element 11 may be of a transmission type or a reflection type.

The drive power source 12 applies a voltage to the diffractive element 11.

When a voltage is applied from a drive power source 12, the multi-step structure 112 of the diffractive element 11 is deformed due to a piezoelectric effect or an electrostrictive effect to change the wavelength and focal length of the emitted light. Details will be described below.

Figure 2A:
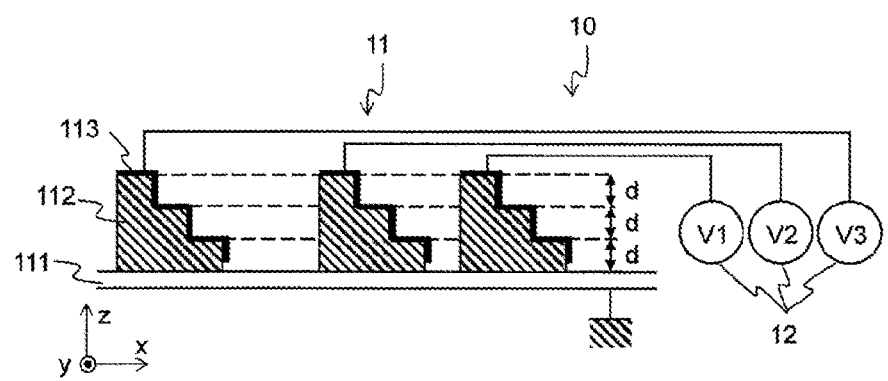
FIG. 2A is a schematic diagram showing a configuration of the diffraction element device according to the first embodiment of the present invention.

FIG. 2A shows a detailed configuration of the diffraction element device 10 according to the first embodiment. The diffractive element 11 has a plurality of multi-step structures 112 on a substrate 111. The arrangement of the multi-step structures 112 on the substrate 111 is determined based on the intensity distribution of diffracted light.

Each multi-step structure 112 is composed of a piezoelectric material or an electrostrictive material, and has a three-step stepped structure. A height (d) of each step is xxx mm, and a width of each step is xxx mm.

Here, for the piezoelectric material, quartz, barium titanate, lead titanate, lead zirconate titanate, potassium niobate, lithium niobate, lithium tantalate, and potassium tantalate niobate can be used.

Further, for the electrostrictive material, barium titanate, potassium tantalate niobate, lithium niobate, potassium tantalate, and lead magnesium niobate can be used.

Each multi-step structure 112 is a monolithic structure formed by processing a piezoelectric material or an electrostrictive material in etching or the like and integrally formed of the piezoelectric material or the electrostrictive material.

Assuming that the height of each step is d and the number of steps is N when no voltage is applied to the multi-step structures 112, a diffraction efficiency thereof at a predetermined wavelength depends on the height D (equal to N×d) of the multi-step structures 112. In other words, the wavelength at which the diffractive element 11 is most effective, that is, the wavelength targeted by the diffractive element, depends on the height D (equal to N×d) of the multi-step structures 112 determined by the height d of each step and the number of steps N.

Each of the multi-step structures 112 has an electrode 113 on the entire surface thereof, and the electrode 113 is connected to the drive power source 12.

In each of the multi-step structures 112, the surface (back surface) opposite to the surface (front surface) having the electrode 113 is connected to the ground via a substrate 111. The front surface or the back surface of the substrate 111 is connected to the ground.

The substrate 111 may be made of a conductive material such as a metal or a semiconductor, or may be made of an insulating material such as a resin or glass. When an insulating material is used for the substrate 111, for example, a metal film or the like may be formed on the surface of the substrate 111 in contact with the back surface of the multi-step structure 112 to be connected to the ground.

In addition, the substrate 111 may be made of the same piezoelectric material or electrostrictive material as the multi-step structures 112. In this case, the substrate 111 and the multi-step structures 112 may be integrated to have a monolithic structure.

Operation of Diffraction Element Device

Next, an operation of the diffraction element device 10 according to the present embodiment will be described based on changes of a piezoelectric material and an electrostrictive material caused by a voltage.

The piezoelectric material is a material that causes distortion proportional to an applied voltage, and a distortion S can be calculated in the following expression using a thickness L of the piezoelectric material, an applied voltage V, and a change amount ΔL of L generated by the voltage.

Equation 1

$$S = \frac{\Delta L}{L} = \frac{1}{L} d_{ij} E_i L = \frac{d_{ij}}{L} V \tag{1}$$

Here, $d_{ij}$ denotes a piezoelectric constant, and $E_i$ denotes an electric field.

Furthermore, the electrostrictive material is a material that causes distortion proportional to the square of the applied voltage, and the distortion x can be calculated using the following expression.

Equation 2

$$\begin{pmatrix} x_1 \\ x_2 \\ x_3 \\ x_4 \\ x_5 \\ x_6 \end{pmatrix} = \begin{pmatrix} Q_{11} & Q_{12} & Q_{12} & 0 & 0 & 0 \\ Q_{12} & Q_{11} & Q_{12} & 0 & 0 & 0 \\ Q_{12} & Q_{12} & Q_{11} & 0 & 0 & 0 \\ 0 & 0 & 0 & Q_{44} & 0 & 0 \\ 0 & 0 & 0 & 0 & Q_{44} & 0 \\ 0 & 0 & 0 & 0 & 0 & Q_{44} \end{pmatrix} \begin{pmatrix} P_1^2 \\ P_2^2 \\ P_3^2 \\ P_2 P_3 \\ P_3 P_1 \\ P_1 P_2 \end{pmatrix} \tag{2}$$

Here, Q denotes an electrostrictive coefficient, and P denotes polarization.

In addition, $x_1$, $x_2$ and $x_3$ denote distortions resulting from electrostrictive effects in the x-axis direction, y-axis direction, and z-axis direction, respectively. Here, the x-axis direction, the y-axis direction and the z-axis direction are shown in FIG. 2A. In addition, $x_4$, $x_5$, and $x_6$ denote shear distortion.

The height d of each step in the multi-step structures 112 changes in the (001) direction due to the piezoelectric effect or the electrostrictive effect. For example, when the height d of each step is 1 mm, a displacement Δd caused by the piezoelectric effect or the electrostrictive effect is about 10 μm.

In this way, the height d of each step can be changed by applying a voltage to the multi-step structures 112 in the diffractive element 11. Therefore, the wavelength and focal length of light incident on the diffractive element 11 can be changed by applying different voltages to each of the multi-step structures 112 to change the height D of the multi-step structures 112 to a different height.

Figure 3:
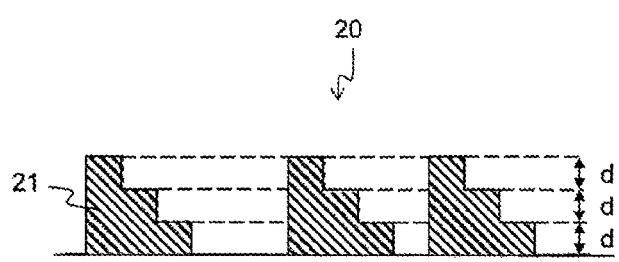
FIG. 3 is a schematic diagram for describing the diffraction element device according to the first embodiment of the present invention.

With respect to a diffractive element 20 that does not use a piezoelectric effect or an electrostrictive effect as shown in FIG. 3, a wavelength targeted by the diffractive element depends on a height D of multi-step structures 21 determined by a height d of each step and the number of steps N (equal to N×d), and a height D of the multi-step structures 21 does not change, and thus the diffractive element operates only at a single wavelength.

The diffraction element device 10 according to the present embodiment can operate in response to multiple wavelengths because the height of each step changes due to the piezoelectric effect or the electrostrictive effect as described above.

When a desired light intensity distribution is formed and an image is formed at a desired focal length in the diffraction element device 10 according to the present embodiment, the wavelength of a light beam diffracted by the diffractive element 11 and the height of the multi-step structures 112 are proportional to each other.

Therefore, for example, assuming that the height of the multi-step structures 112 operating at a wavelength λ is D and the proportional coefficient is a, the height D of the multi-step structures 112 for causing the diffraction element device 10 to operate with respect to a light beam with the wavelength λ is aλ.

As described above, a single diffraction element device can operate for multi-wavelength light beams.

Further, according to the diffraction element device 10 of the present embodiment, for example, when the wavelength of an emitted light beam (diffracted light beam) is set to a desired wavelength λ1, the focal length can change to a desired focal length, for example, f1 to fn. Similarly, when the wavelength of diffracted light is set to another desired wavelength λ2, the focal length can be changed to a desired focal length, for example, f1 to fn.

Thus, according to the diffraction element device 10 of the present embodiment, the focal length can be changed to, for example, f1 to fn for light with multiple wavelengths, for example, light with wavelengths of λ1 to λm. In other words, the wavelength and the focal length can be changed.

In the configuration of the diffractive element 20 shown in FIG. 3, only a single focal length can be set for a single wavelength by a single diffractive element. On the other hand, according to the diffraction element device 10 of the present embodiment, a large number of focal lengths can be set for light with multiple wavelengths.

Figure 2B:
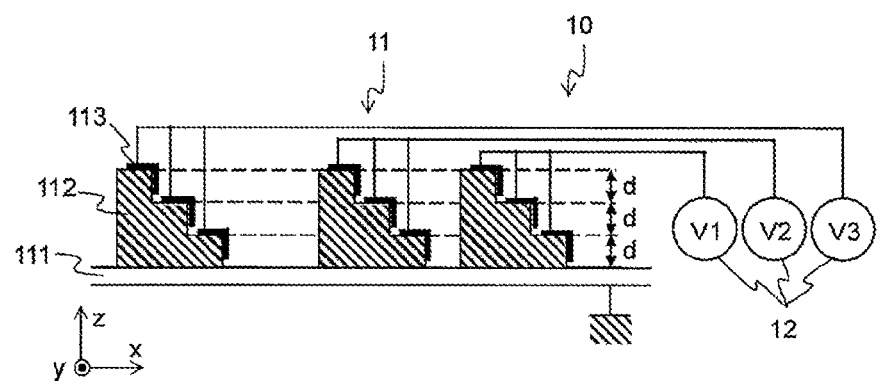
FIG. 2B is a schematic diagram showing a configuration of the diffraction element device according to the first embodiment of the present invention.
Figure 2C:
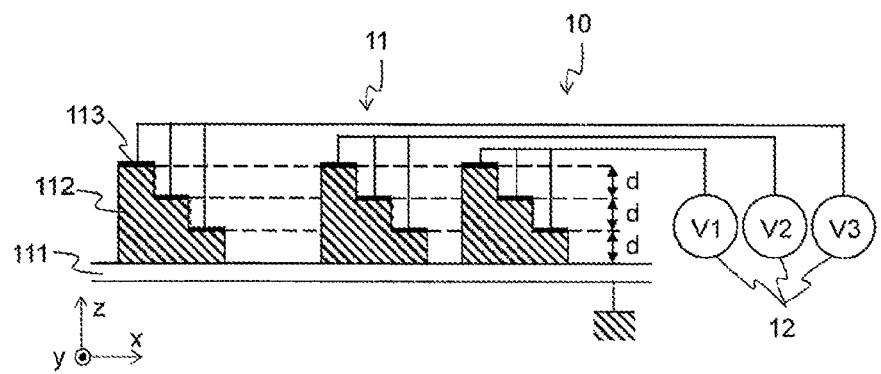
FIG. 2C is a schematic diagram showing a configuration of the diffraction element device according to the first embodiment of the present invention.

Although the example in which the electrodes 113 are formed on the entire surfaces of the multi-step structures 112 in the diffraction element device 10 according to the present embodiment has been introduced, the electrodes 113 may be formed on the surface (the horizontal plane) and the end surface (the vertical plane) of each step as shown in FIG. 2B. Also, the electrodes 113 may be formed on the surface (the horizontal plane) of each step as shown in FIG. 2C. In addition, the electrodes 113 need not be formed on all steps, but may be formed on the surfaces of some steps. In this way, the electrodes 113 may be formed on some of the surfaces of the steps of the multi-step structures 112.

Second Embodiment

Next, a diffraction element device 30 according to a second embodiment of the present invention will be described with reference to FIG. 4.

Figure 4:
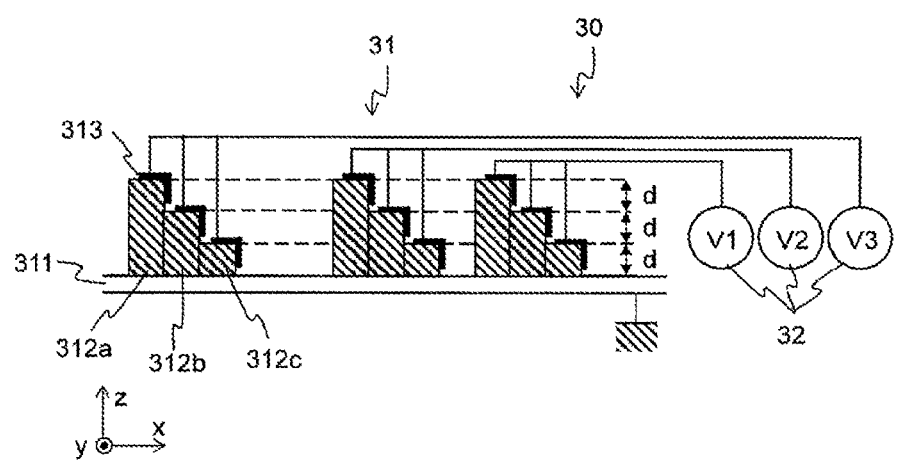
FIG. 4 is a schematic diagram showing a configuration of a diffraction element device according to a second embodiment of the present invention.

FIG. 4 shows a configuration of the diffraction element device 30 according to the second embodiment. Although the diffraction element device 30 according to the present embodiment has substantially the same configuration as the diffraction element device according to the first embodiment, the diffraction element device 30 differs in that the multi-step structures are not monolithic structures, but are constituted by combining independently formed structures 312a to 312c having different heights. Here, a "height" of a structure refers to a length of the structure of the diffraction element device in the direction perpendicular to the substrate.

Each multi-step structure of the diffraction element device 30 is constituted by combining the structures 312a to 312c made of a piezoelectric material or an electrostrictive material having different heights and fixing them with an adhesive or the like. Each of the structures 312a to 312c has an electrode 313 on its surface, and the electrode 313 and a power source 32 are connected.

In the diffraction element device according to the first embodiment, since the multi-step structures are monolithic structures, distortion caused by a piezoelectric effect or an electrostrictive effect is applied to all the multi-step structures. As a result, since each step is affected by the distortion of the adjacent step, the accuracy of the distortion (deformation) of each step deteriorates.

In the diffraction element device 30 according to the present embodiment, distortion due to the piezoelectric effect or the electrostrictive effect occurs in each individual multi-step structure. As a result, since each step is independently deformed without being affected by the distortion of the adjacent step, the accuracy of the distortion (deformation) of each step is improved.

As described above, according to the diffraction element device 30 according to the present embodiment, a large number of focal lengths can be set for light with multiple wavelengths, and optical accuracy in a beam shape and a focal length for diffracted light can be improved.

Third Embodiment

Next, a diffraction element device according to a third embodiment of the present invention will be described with reference to FIG. 5.

Figure 5:
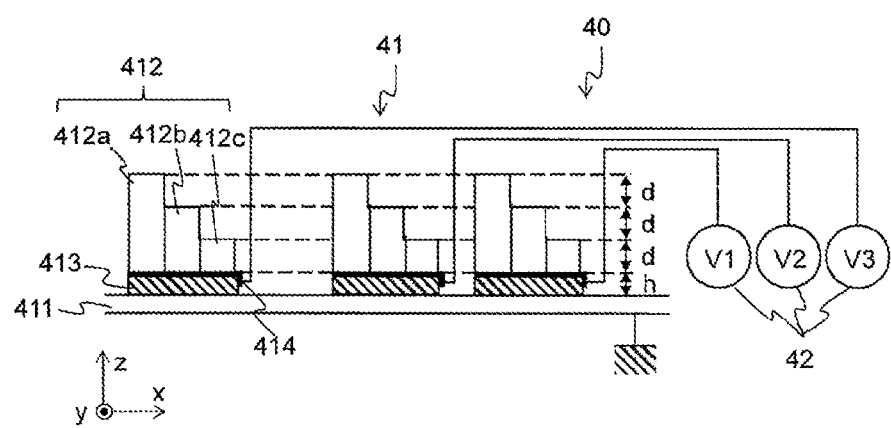
FIG. 5 is a schematic diagram showing a configuration of a diffraction element device according to a third embodiment of the present invention.

FIG. 5 shows a configuration of a diffraction element device 40 according to the third embodiment. Although the diffraction element device 40 according to present embodiment has substantially the same configuration as those of the first and second embodiments, it differs therefrom in the multi-step structure.

Each multi-step structure of the diffraction element device 40 according to the present embodiment includes a piezoelectric material (or an electrostrictive material) 413 on a substrate 411 side, and a surface structure 412 having a multi-step structure on the piezoelectric material (or the electrostrictive material) 413. The surface structure 412 is composed of independent structures 412a to 412c having different heights.

For the surface structure 412, a colorless transparent material such as quartz, molten quartz, zinc sulfide (ZnS), or the like, a semiconductor material such as silicon, silicon carbide, or the like, or a metal material such as copper, aluminum, iron or the like is used. Of course, a piezoelectric material or an electrostrictive material may be used. The surface structure may be composed of a single material or a plurality of materials among these materials. In addition, the surface structure 412 may be configured as a monolithic structure.

An electrode 414 is formed on the piezoelectric material (or electrostrictive material) 413 on the substrate 411 side in the multi-step structure, and is connected to a power source 42.

According to the diffraction element device 40 according to the present embodiment, since the height h of the piezoelectric material (or electrostrictive material) 413 on the substrate 411 side changes by applying a voltage, a height D (equal to N×d+h) of the multi-step structures changes, the wavelength of target diffracted light changes, and thus the focal length can be changed.

Although the example in which the piezoelectric material (or electrostrictive material) 413 on the substrate 411 side is integrated in the multi-step structure has been introduced in the present embodiment, a separate piezoelectric material (or electrostrictive material 413) may be disposed for each step. In this case, since the height can be changed for each step, the wavelength of target diffracted light can be changed with higher accuracy, and the focal length can be changed.

Further, there is a case where the configurations of the diffraction element devices according to the first and second embodiments are restricted in terms of material because the entire multi-step structures are formed of a piezoelectric material or an electrostrictive material. For example, there may be restrictions on the materials such that they cannot be applied to an element having a high absorption coefficient with respect to a predetermined wavelength and transmitting light with a predetermined wavelength. Alternatively, machining accuracy may be affected by the difficulty of machining for the material.

In the diffraction element device 40 according to the present embodiment, since various materials can be used for the surface structure in the multi-step structures, restrictions on materials can be reduced.

Fourth Embodiment

Next, a diffraction element device according to a fourth embodiment of the present invention will be described with reference to FIGS. 6A and 6B.

Figure 6A:
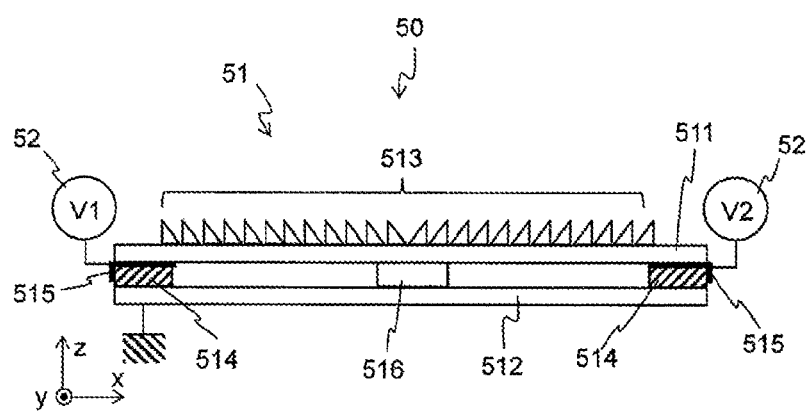
FIG. 6A is a schematic diagram showing a configuration of a diffraction element device according to a fourth embodiment of the present invention.

FIG. 6A shows a configuration of a diffraction element device 50 according to the fourth embodiment.

The diffraction element device 50 according to the fourth embodiment includes actuators 514 and a support portion 516 between an upper substrate 511 and a lower substrate 512, and a plurality of multi-step structures 513 on the surface of the upper substrate 511. Drive power sources 52 are connected to the actuators 514 through electrodes 515. In addition, the lower substrate 512 is connected to the ground.

The actuators 514 are made of, for example, a piezoelectric material or an electrostrictive material. The actuators 514 are not limited to them, and may be micro-machines, or the like.

Figure 6B:
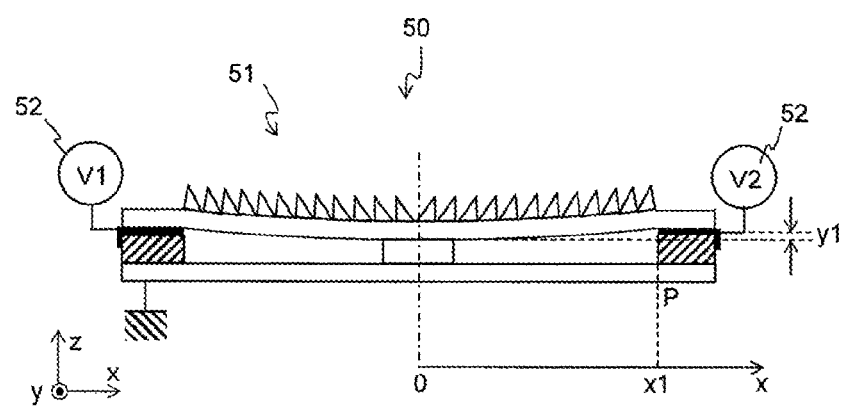
FIG. 6B is a schematic diagram for describing an operation of the diffraction element device according to the fourth embodiment of the present invention.

In the diffraction element device 50, the actuators 514 are driven by the drive power sources 52 to change the radius of curvature of the upper substrate 511 and to change the focal length as shown in FIG. 6B.

By setting the center point between the upper substrate 511 and the lower substrate 512 as an origin, when the actuator 514 arranged at a point P separated by x1 from the origin is driven and the point P is displaced by y1 in the direction perpendicular to the x direction (y direction), the upper substrate 511 is deformed to be close to a circular arc, and the radius of curvature R of the circle is represented by the expression (3).

Equation 3

$$R = \frac{x1^2}{2y1} + \frac{y1}{2} \quad (3)$$

Thus, the upper substrate 511 operates as a movable concave mirror or convex mirror.

When the focal length of the designed value of the diffraction element device 50 is set to f, the lens power of the diffraction element device 50 is 1/f. On the other hand, when the upper substrate 511 is deformed by the actuator 514 to have the radius of curvature R, the lens power of the diffraction element device 50 changes by 1/R. The change in the focal length of this time Δf is expressed by the expression (4).

Equation 4

$$\Delta f = \frac{1}{\frac{1}{f} - \frac{1}{R}} \quad (4)$$

As described above, according to the diffraction element device 50 of the present embodiment, the curvature of the upper substrate 511 can be changed and thus the focal length can be changed.

Further, according to the diffraction element device 50 of the present embodiment, the focal length can be adjusted when the temperature of the diffraction element device rises due to absorbed light beams and thus the focal length changes. In other words, the thermal lens effect can be offset.

If the configuration of the diffraction element device 50 according to the present embodiment is applied to the configurations of the diffraction element devices according to the first to third embodiments, the accuracy of the focal length can be further improved by offsetting the thermal lens effect.

The multi-step structure 513 of a diffractive element 51 may be formed of a piezoelectric material or an electrostrictive material, and the height of the multi-step structure may be variable by a voltage, may be formed of a colorless transparent material such as quartz, molten quartz, or zinc sulfide, a semiconductor material such as silicon or silicon carbide, or a metal such as copper, iron, or aluminum, and the height of the multi-step structure may not be variable.

The upper substrate 511 and the lower substrate 512 may be formed of a piezoelectric material or an electrostrictive material, and the height of the multi-step structure may be variable by a voltage, may be formed of a colorless transparent material such as quartz, molten quartz, or zinc sulfide, a semiconductor material such as silicon or silicon carbide, or a metal such as copper, iron, or aluminum, and the height of the multi-step structure may not be variable. They may be formed of the same material as or a different material from that of the multi-step structure 513.

Although the example in which the lower substrate is connected to the ground with respect to the diffraction element device 50 according to the present embodiment has been introduced, the upper substrate may be connected to the ground. Alternatively, a power source may be connected to the upper substrate or the lower substrate, and the actuators may be connected to the ground.

When the upper substrate 511 or the lower substrate 512 is connected to a power source or the ground by using an insulating material, for example, a metal film or the like may be formed on the surface of the upper substrate 511 or the lower substrate 512 in contact with the surface facing the surface of the electrode of the actuator, and the upper substrate 511 or the lower substrate 512 may be connected to the power source or the ground.

Examples of Present Invention

Next, a first example of the present invention will be described. The present embodiment shows an example in which the diffraction element device 10 according to the first embodiment is used for laser machining.

laser machining is performed on a material having a large light absorption with respect to light with the wavelength of 2 μm.

A laser beam emitted from a laser light source having an output of 1 kW, a wavelength of 1 μm, a rectangular beam shape of 1 mm in length and 2 mm in width is made incident on a diffraction element device 10, and the material is machined by using diffracted light whose wavelength has been converted to 2 μm. At this time, a voltage is applied to the diffractive element to double the height of the multi-step structure, thereby converting the laser beam having the wavelength of 1 μm into a laser beam with the wavelength of 2 μm.

As a result, spark at the time of machining can be suppressed, a good machined surface can be obtained, and machining quality can be improved.

Here, the wavelength of diffracted light can be changed by changing the voltage applied to the diffractive element according to the wavelength absorbed by the material to be machined. For example, for a material having a high light absorption at the wavelength of 1.5 μm, a voltage may be applied to the diffractive element with respect to a laser beam having the wavelength of 1 μm to increase the height of the multi-step structure 1.5 times. For example, for a material having a high light absorption at the wavelength of 2.5 μm, a voltage may be applied to the diffractive element with respect to a laser beam having the wavelength of 1 μm to increase the height of the multi-step structure 2.5 times.

Thus, the single diffraction element device 10 can emit diffracted light with multiple wavelengths and can be used for laser machining.

Although the example in which the diffraction element device according to the first embodiment is used has been introduced in this example, a diffraction element device according to the second to fourth embodiments may be used.

Modified Example of Present Invention

Next, a diffraction element device according to a modified example of the first to fourth embodiments of the present invention will be described. The diffraction element device according to the present modified example uses the diffractive element 11 of the diffraction element device according to the first embodiment.

In the diffraction element device according to the present modified example, an AC power source is connected to the electrodes 113 of the multi-step structures 112 of the diffractive element 11, instead of the DC power source in the first embodiment.

In an operation of the diffraction element device according to the present modified example, an AC voltage from the AC power source is applied to the diffractive element to perform a modulation operation. Since the phase of an incident light beam is modulated and resonated due to the modulation operation of the diffractive element, the optical accuracy is improved. As a result, for example, when this operation is applied to laser machining, the machining accuracy can be improved.

Although the example in which the diffraction element device according to the first embodiment is used has been introduced in the present modified example, the diffractive element according to the second to fourth embodiments may be used.

In the diffraction element device according to the embodiments of the present invention, for the piezoelectric material, at least one kind among quartz, barium titanate, lead titanate, lead zirconate titanate, potassium niobate, lithium niobate, lithium tantalate, and potassium tantalate niobate can be used. Further, for the electrostrictive material, at least one kind among barium titanate, potassium tantalate niobate, lithium niobate, potassium tantalate, and lead magnesium niobate can be used.

The structures and dimensions of the multi-step structures shown in the diffraction element devices according to the embodiments of the present invention are not limited to the above. Although the example in which the height and width of each step are made constant in the multi-step structures has been introduced, the present invention is not limited to this, and the height and width of each step may not be constant. In addition, the multi-step structures are not limited to having three steps, and may have a plurality of steps.

Although the example of the diffraction element device according to the embodiment of the present invention in which the electrodes formed in a part of the multi-step structures or the actuators made of a piezoelectric material or an electrostrictive material is connected to the power source and the substrate is connected to the ground has been introduced, the present invention is not limited thereto, and the electrodes formed in a part of the multi-step structures or the actuators made of a piezoelectric material or an electrostrictive material may be connected to the ground and the substrate may be connected to the power source.

Although the examples of structure, dimensions, materials, and the like of each constituent parts for the configuration and manufacturing method of the diffraction element device have been introduced in the embodiments of the present invention, the present invention is not limited to them. The diffraction element device may be any one which exhibits the functions of the diffraction element device and exhibits the effects.

INDUSTRIAL APPLICABILITY

Embodiments of the present invention can be applied to control and convergence of beam light such as a laser beam used in machining techniques in the industrial field and the medical field.

REFERENCE SIGNS LIST

10 Diffraction element device
11 Diffractive element
111 Substrate
112 Multi-step structure
113 Electrode
12 Power source.

The invention claimed is:

1. A diffraction element device comprising:
a diffractive element including a substrate and a plurality of multi-step structures on the substrate, each of the plurality of multi-step structures composed of a plurality of steps including at least one of a piezoelectric material or an electrostrictive material; and
a power source configured to apply voltage to the diffractive element, wherein a height of each of the plurality of multi-step structures changes due to a voltage applied from the power source.

2. The diffraction element device according to claim 1, wherein the height of each of the plurality of steps is configured to change in response to a voltage applied from the power source.

3. The diffraction element device according to claim 1, wherein each of the plurality of multi-step structures comprises a plurality of structures having different heights.

4. The diffraction element device according to claim 1, wherein the substrate and the plurality of multi-step structures are formed of a same material and have a monolithic structure.

5. The diffraction element device according to claim 1, wherein each of the plurality of multi-step structures includes the plurality of steps arranged on a side surface of the substrate.

6. A diffraction element device comprising:

a lower substrate;

an upper substrate arranged apart from the lower substrate and including a plurality of multi-step structures disposed on a side of the upper substrate that is opposite to the lower substrate; and an actuator disposed between the upper substrate and the lower substrate, the actuator being configured to change a curvature of the upper substrate according to an applied voltage.

7. The diffraction element device according to claim 6, wherein the actuator is made of a piezoelectric material or an electrostrictive material.

8. The diffraction element device according to claim 6, further comprising a power source connected to the actuator, the upper substrate, or the lower substrate.

9. The diffraction element device according to claim 8, wherein the power source is configured to modulate a change in height of each of the plurality of multi-step structures.

10. The diffraction element device according to claim 8, further comprising an electrode provided in a part of each of the plurality of multi-step structures and electrically connected to the power source.

11. The diffraction element device according to claim 6, further comprising a power source configured to modulate the change of the curvature of the upper substrate.

12. A diffraction element device comprising:

a diffractive element including a substrate and a plurality of multi-step structures on the substrate, each of the plurality of multi-step structures composed of a plurality of steps including at least one of a piezoelectric material or an electrostrictive material, wherein a height of each of the plurality of multi-step structures is configured to change in response to an applied voltage.

* * * * *